United States Patent [19]

Olansen et al.

[11] 4,306,706
[45] Dec. 22, 1981

[54] CRYOGENIC VALVE SEAL

[75] Inventors: Ronald A. Olansen, Lyme; John M. Cory, Old Lyme, both of Conn.; Harry C. Champlin, Jr., Ashaway, R.I.

[73] Assignee: Posi-Seal International, Inc., North Stonington, Conn.

[21] Appl. No.: 74,530

[22] Filed: Sep. 11, 1979

[51] Int. Cl.³ .............................................. F16K 1/22
[52] U.S. Cl. ..................................... 251/306; 251/368
[58] Field of Search .............. 251/171, 174, 172, 173, 251/306, 368; 277/26, 27

[56] References Cited

U.S. PATENT DOCUMENTS

| 3,512,789 | 5/1970 | Tanner | 277/26 |
| 3,642,248 | 2/1972 | Benware | 251/174 |
| 3,986,699 | 10/1976 | Wucik | 251/173 |
| 4,145,057 | 3/1979 | Wheeler | 277/27 |
| 4,165,859 | 8/1979 | Waciulaitis | 251/173 |
| 4,195,815 | 4/1980 | Stager | 277/26 X |

FOREIGN PATENT DOCUMENTS 888138  1/1962  United Kingdom .................. 277/26

Primary Examiner—Harold W. Weakley
Attorney, Agent, or Firm—Kenyon & Kenyon

[57] ABSTRACT

A valve seal mechanism for cryogenic applications includes an undercut groove in a seating region of the fluid passageway in a valve body. Disposed within the groove is a shouldered resilient wear ring of polytetrafluoroethylene, the outer circumference of the shouldered portion of the wear ring having a V-shaped channel formed therein. A solid backing ring having an inner circumferential surface of wedge-shaped cross section makes an interference fit with the V-channel of the wear ring, thereby preloading the channel sides against the respective adjacent sides of the groove. A valve disc has a sealing surface which makes an interference fit with a seating surface forming the inner circumferential surface of the wear ring. Introduction of fluid under pressure and reduction of temperatures from normal ambient to cryogenic both tend to increase sealing effectiveness.

5 Claims, 7 Drawing Figures

CRYOGENIC VALVE SEAL

BACKGROUND

This invention relates to valve seals, and particularly to valve seals intended for cryogenic service.

In U.S. Pat. No. 3,642,248, issued to Robert E. Benware and owned by the assignee of the present invention, a valve sealing mechanism is disclosed in the form of a shouldered wear ring confined in an undercut circumferential groove. The wear ring has a seating portion in the form of a continuous central annular rib extending radially beyond the shouldered portion through the opening in the groove, the circumferential surface of the rib serving as a seating surface in mating contact with a complementary valve member sealing surface.

The wear ring in the Benware patent preferably is combined with an elastomeric O-type backing ring positioned between the bottom of the groove and the shouldered portion of the wear ring. The backing ring serves the dual function of urging the wear ring out of the groove into firm contact with the sealing surface and of sealing against leakage of fluid under pressure behind the wear ring.

The Benware patent also discloses alternative backing members in the form of coil garter springs for use in applications involving very high and very low temperatures which would be incompatible with the elastomeric materials of the O-type backing rings. Such coil garter springs can be used alone behind the wear ring or in combination with springable, curved stiffening plates; wedge-shaped discontinuous dummy cushions (particularly for cryogenic applications); or with a plurality of tensile hoop-like bands disposed inside the coils of the garter spring to increase preloading of the wear ring. In still another arrangement, the combination of coil garter spring and tensile bands can be replaced by a finger spring.

Although the various garter spring embodiments of the Benware patent have provided effective sealing for valves in cryogenic applications, they have inherent drawbacks. Because it is necessary to use a hard, and consequently stiff, plastic material for the wear ring when handling fluids at very low cryogenic temperatures, a very high preload is demanded from the garter spring, so that usually the above-mentioned additional tension bands are required. At the same time, the garter spring coils tend to cut into the wear ring material unless stiffening plates or dummy cushions are interposed between the coil spring and the wear ring. Assembly of such multi-component seals is difficult and time-consuming, and such assemblies have a high rejection rate under test inspections. In addition, the buildup of tolerances in a multi-component assembly requires high precision for the individual components, adding to the cost.

SUMMARY OF THE INVENTION

Accordingly, it is the principal object of the present invention to provide a simple valve seal having a minimum number of components, yet which yields improved sealing at both cryogenic and normal ambient temperatures.

Another object of the invention is to provide a valve arrangement having two concentrically disposed preloaded sealing elements in a seat groove in which both radial and axial preloading is increased with decreasing temperature.

These and other objects are achieved by the cryogenic seal mechanism of the present invention for a valve having a valve body with a fluid inlet and a fluid outlet connected by a passageway, an annular seating region defined by an interior circumferential surface of the passageway intermediate the inlet and outlet, and an annular undercut circumferential groove formed in the wall of the passageway in the seating region; a valve member having a circumferential sealing surface; means for mounting the valve member in the passageway for selective movement of the sealing surface into and out of opposed relation to the groove; a resilient wear ring disposed in the groove and movable radially inward and outward therein, the wear ring having an inner circumferential seating portion protruding radially inward from the groove into the passageway and an outer circumferential shoulder portion within the groove, the inner circumference of the seating portion forming a radially inward facing seating surface which makes an interference fit with the sealing surface of the valve member when the valve is shut, and the outer circumference of the shoulder portion having a radially outward facing annular channel formed therein, the sides of the channel being bevelled outwardly to provide the channel with an at least partly V-shaped cross section, said channel dividing the shoulder portion into two axially-spaced parts the outer edges of which bear against the respective adjacent sides of the groove; and a backing ring disposed in said groove between the channel of the wear ring and the radially outward region of the groove, said backing ring urging the seating portion of said wear ring radially inward from said groove and urging the spaced annular parts of the shoulder portion against the respective sides of the groove, wherein the improvement of the present invention comprises said backing ring being formed as an annular band having an inner circumferential surface which is bevelled outwardly from a central region to both sides of the band to provide a wedge-shaped cross section, the bevelled sides of said wedge-shaped inner circumferential surface of the backing ring making a predetermined interference fit with the bevelled sides of the channel of the wear ring.

The wedge angle of the bevelled inner circumferential surface of the backing ring preferably is greater than the initial angle between the bevelled sides of the channel in the shoulder portion of the wear ring, and said wedge angle is preferably about 90 degrees, so the resultant of the force exerted by the backing ring against the rear ring is divided about equally into increasing the radial sealing force between the seating surface of the wear ring and the sealing surface of the valve member and increasing the lateral sealing force between the annular parts of the shoulder portion and the respective adjacent sides of the groove.

In the preferred embodiment, the wear ring is composed of a fluorinated thermoplastics material, such as is sold under the trademarks "Kel-F" or "Teflon", and the backing ring is composed of aluminum.

The foregoing and other objects, features, and advantages of the present invention will become apparent from the description of the preferred embodiment in connection with the drawings.

DESCRIPTION OF THE PREFERRED EMBODIMENT

Figure 1:
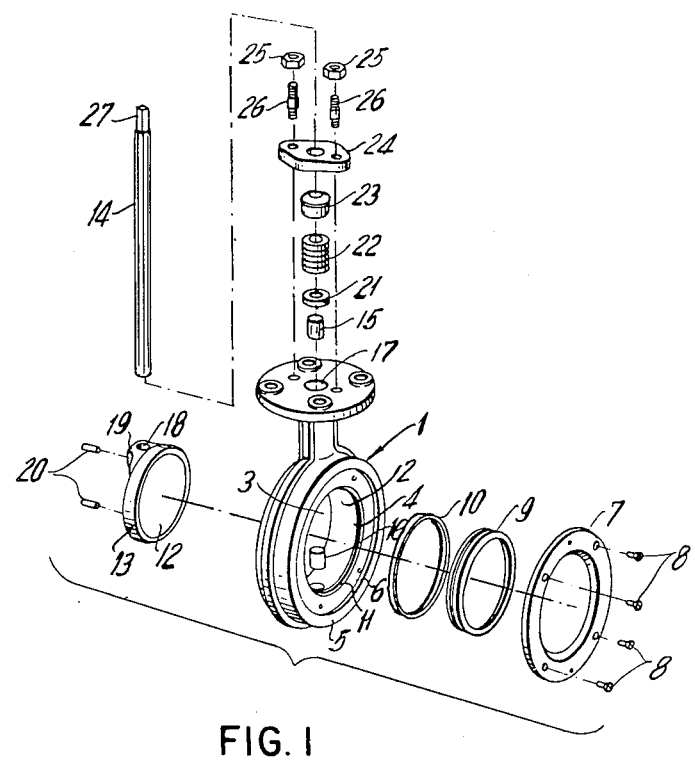
FIG. 1 is an exploded perspective view of a butterfly valve incorporating the cryogenic seal of the present invention.

To aid in understanding the arrangement and operating principle of the improved cryogenic valve seal of the present invention, it will be described in an embodiment as incorporated in an otherwise conventional butterfly valve or trunnion valve. FIG. 1 shows such a valve in exploded perspective.

The trunnion valve in FIG. 1 includes a valve body 1 in the form of a flat annular wafer having an internal passageway 2 with an inlet 3 and an outlet 4. The downstream or outlet face 5 of the valve body is counterbored with an annular recess 6 for flush mounting a retainer ring 7 by means of flat head machine screws 8. Retainer ring 7 serves to hold a sealing ring or wear ring 9 and a backing ring 10 within a circumferential groove 11 machined in the downstream edge of passageway 2.

A valve disc 12 having a circumferential sealing surface 13 is adapted to be mounted within passageway 2 for rotation about a diametral axis between an open position in which the valve disc is substantially parallel to the axis of passageway 2 and a shut position in which the valve disc is substantially perpendicular to the passageway axis. In the shut position, sealing surface 13 makes mating interference contact with a seating surface of wear ring 9.

A means for pivotally mounting the valve disc in the passageway for rotation between the open and shut positions includes a valve stem 14 mounted in upper and lower bushings 15 and 16 for rotation within a blind hole 17 bored diametrally through the valve body. Valve stem 14 passes through a hole 18 drilled through a diametral boss 19 on the upstream face of the valve disc, which is locked to the stem by pins 20.

Leakage past the upper end of valve stem 14 is prevented by conventional stem packing means including spacer 21 and resilient packing rings 22, which are compressed in hole 17 against the top of bushing 15 by forcing gland 23 and follower 24 downward by means of nuts 25 screwed down on studs 26. Valve stem 14 is rotated in its bushings by a handle or motor drive (not shown) attached to the squared upper end 27 of the stem.

The structure and operation of the improved cryogenic seal of the present invention is shown in detail in FIGS. 2–7.

Figure 2:
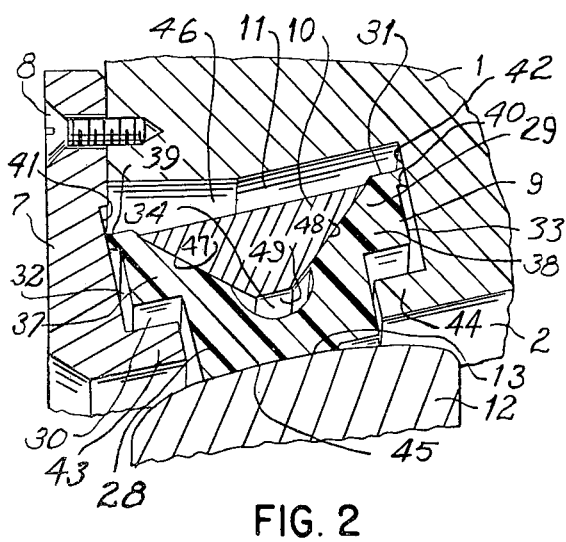
FIG. 2 is a partial cross section of the preferred embodiment of the seal mechanism in the assembled valve of FIG. 1, with the valve disc shut.

FIG. 2 shows a section of the assembled valve in FIG. 1 incorporating the preferred embodiment of the cryogenic seal arrangement of the present invention.

The shape of wear ring 9 and its disposition in undercut groove 11 are substantially the same as in prior art valve seals of the type disclosed in the above-referenced Benware U.S. Pat. No. 3,642,248.

Wear ring 9 is formed with an inner circumferential seating portion 28, which protrudes radially inward from the groove into passageway 2, and an outer circumferential shoulder portion 29 retained within the groove. Circumferential shoulder portion 29 is defined by an inner circumference 30, an outer circumference 31 and sides 32 and 33. The outer circumference 31 of the shoulder portion has a radially outwardly facing annular channel 34 formed therein, the channel having outwardly bevelled sides 35 and 36 to provide the channel with an at least partly V-shaped cross section. Channel 34 divides the shoulder portion into two axially spaced (with reference to the axis of the wear ring) annular parts 37 and 38 having outer edges 39 and 40, respectively, which bear against the respective adjacent sides 41 and 42 of groove 11.

Shoulder portion 29 of the wear ring is wider than seating portion 28 and is retained within the groove by lips 43 and 44. Seating portion 28 extends radially inward between the groove lips to an inner circumference which defines a seating surface 45 which makes a predetermined interference fit with sealing surface 13 of the valve disc when the latter is disposed opposite the groove in the shut position.

As shown in FIG. 2, backing ring 10 is a solid annular band disposed between channel 34 of the wear ring and a radially outward region 46 of groove 11. The inner circumferential surface of the backing ring includes two bevelled surfaces 47 and 48 extending outwardly from a central region 49 to provide a wedge-shaped cross section for the band, the bevelled surfaces 47 and 48 matingly engaging the opposing bevelled sides 35 and 36 of the wear ring with a predetermined interference fit.

Figure 3:
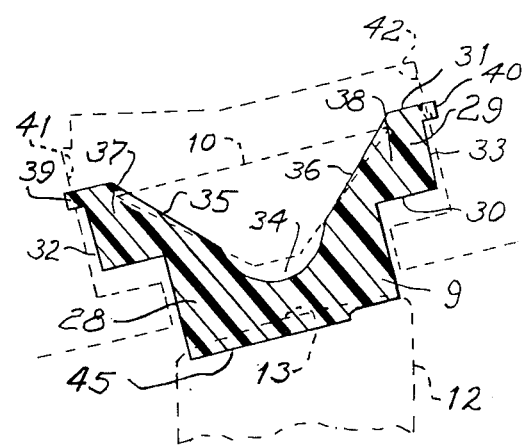
FIG. 3 is a cross section of a wear ring in its initial unconfined condition, with outlines of the seating groove, backing ring, and valve disc in dashed lines to show the interference fits therebetween.

FIG. 3 illustrates the interference fits among the several components of the cryogenic seal mechanism of the present invention in relation to the original dimensions of the unstressed wear ring, to show how these interference fits combine and interact so that each one contributes to increasing the sealing pressure at each contact region of the wear ring with the groove and with the valve disc. Specifically, the interference fit between the side walls 41 and 42 of the groove and the respective adjacent outer edges 39 and 40 of the wear ring forces the two annular parts of the shoulder portion towards each other. The wear ring exerts a relatively modest sealing force against the sides of the groove as a direct result of this deflection, but this sealing force is amplified by the laterally inward forces acting on the bevelled surfaces of the backing ring as a further result of this deflection. These lateral forces tend to make the backing "ride up" the sloping sides of the wear ring, thereby increasing the hoop tensile stress in the backing ring and tending to compress the wear ring and to force the seating portion radially inward from the groove.

Figure 4:
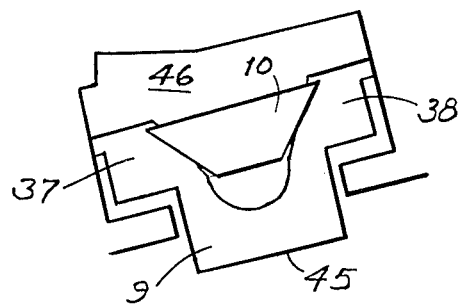
FIG. 4 is a partial section schematic view, of the assembled valve seal mechanism, but with the valve disc open.

The interference fit of the backing ring with the wear ring produces the same result by introducing forces between the opposed bevelled surfaces of the backing ring and the wear ring from the opposite direction. The shift in position of the wear ring at ambient temperature with respect to the groove as a result of adding the backing ring is shown in FIG. 4, where the initial position of the wear ring without the backing ring is shown in dashed lines. As a consequence of the interference fit of the backing ring with the wear ring, the initial lateral preload of the wear ring against the sides of the groove is increased, and the seating portion of the wear ring is urged from the groove.

Figure 5:
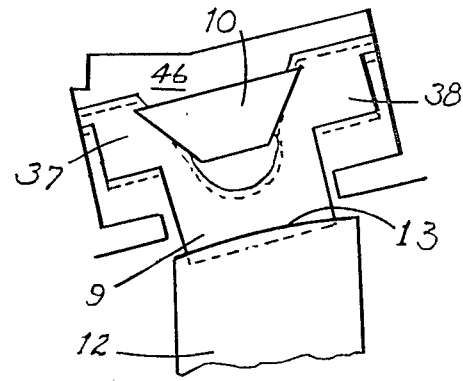
FIG. 5 is a partial section schematic view, of the assembled valve seal mechanism with the valve disc shut, similar to FIG. 1 but showing the sealing forces resulting from the interference fit between the valve disc and the wear ring.

The changes in position of the wear ring and backing ring from this condition as a result of shutting the valve disc are shown next, in FIG. 5, where the condition of FIG. 4 is shown in dashed lines. It is clear that not only do the respective interference fits of the valve disc and the backing ring with the wear ring act in opposite directions radially to increase the pressure between the seating surface of the wear ring and the sealing surface of the disc, but also the wedging action of the backing ring tends to spread apart the two annular parts of the shoulder portion to increase the lateral sealing pressure between the wear ring and the sides of the groove.

Figure 6:
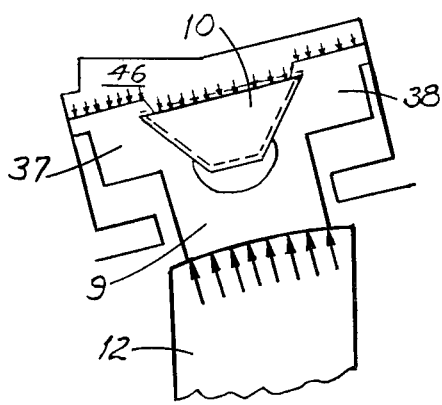
FIG. 6 is a partial section schematic view of the assembled valve seal mechanism at normal ambient temperature, with the valve disc shut and fluid under pressure on the inlet side of the seating region.

FIG. 6 illustrates the further sealing effectiveness that occurs when fluid under pressure is introduced into the valve when the disc is in the shut position. To the extent that any fluid leakage occurs past the upstream contact between the outer edge 40 of the wear ring and the adjacent wall 42 of the groove, the resulting fluid pressure in the outer region 46 of the groove acts radially inwardly, as shown by the arrows 50, to increase the sealing pressure between the wear ring and the valve disc, as illustrated by the opposing arrows 51. The relative lengths of the two sets of arrows indicate that the sealing pressure between the wear ring and the valve disc is amplified over the pressure of the fluid in region 46 of the groove by the ratio of the outer circumferential area of the shoulder portion to the inner circumferential area of seating surface 45. In addition, the fluid pressure acting against the outer circumference of the backing ring is partially transformed into increased lateral force of the wear ring against the sides of the groove by reason of the bevelled interfaces between the backing ring and the wear ring.

Figure 7:
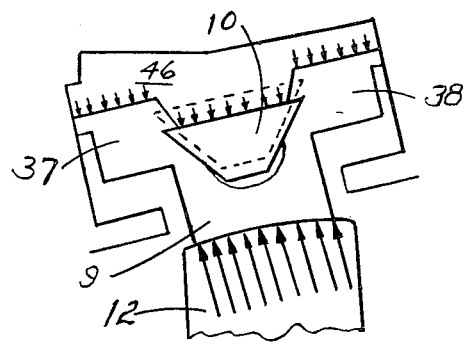
FIG. 7 is a partial section schematic view similar to FIG. 6 but at cryogenic temperature conditions.

Finally, the particular effectiveness of this seal arrangement for cryogenic applications is illustrated in FIG. 7, which shows the shift of position of the backing ring from the condition in FIG. 6 as a result of reducing the system temperature from normal ambient to cryogenic, the position of FIG. 6 being represented by dashed lines. The cryogenic contraction of the backup ring, relative to the lesser contraction of the wear ring and the other valve parts, results in still further increases in lateral and radial sealing pressures because of the wedging action of the backing ring.

To obtain this favorable increased cryogenic sealing, the material of the wear ring is preferably composed of a fluorinated thermoplastic, while the backing ring is desirably made of aluminum. The valve body and valve disc are typically made of stainless steel.

Aluminum is particularly desirable for use as a backing ring material because it combines low modulus of elasticity with high strength at both normal ambient and cryogenic temperatures, compatibility with cryogenic fluids, and low material and machining costs. Another material which exhibits physical properties even superior for this application to aluminum is a nickel-chromium alloy, such as that sold under the trademark Inconel 718. This alloy has a much higher material cost and is considerably more difficult to machine than aluminum, however. Still another possible material for the backing ring is stainless steel. Stainless steel has the drawback, however, that its ratio of yield strength to Young's modulus is so low that cryogenic contraction under service conditions will usually create internal stresses exceeding the yield point, causing a stainless steel backing ring to take a permanent set, thereby reducing the sealing effectiveness at normal ambient temperatures.

In fact, aluminum may also be stressed beyond its yield point in smaller diameter valves, so that nickel-chrome might be the best choice in such a case.

Since a fluorinated thermoplastic such as "Kel-F" has a ratio of yield strength to modulus of elasticity that is higher than any of the three metals suggested for the backing ring, it is also a potential material for use in the backing ring as well as the wear ring. Its principal drawback is that its yield strength is very low compared with the metals, so it cannot be designed with a very high initial preload. Consequently, it will produce poorer sealing effectiveness than the metals.

As noted above, the wedging action of the backing ring design of the present invention is the most important feature of the invention. The preferred angle between the bevelled sides of the backing ring is about 90 degrees; that is, each side makes approximately a 45 degree angle with a central plane perpendicular to the axis of the ring. This angle is preferred for two reasons. First, it divides the interference forces acting between the backing ring and the wear ring approximately equally between lateral and radial sealing forces. Secondly, this angle acts substantially reversibly to transform lateral forces to radial and radial forces to lateral, so that optimum sealing pressures are maintained at all three points of contact between the wear ring and the valve structure, regardless of whether interference forces are introduced laterally or radially.

In further connection with the effect of fluid pressure on the sealing action, as illustrated by FIG. 6, it should be noted that the wider the outer circumference of the backing ring is, the more will fluid pressure against it produce the wedging effect which is the principal advantageous feature of this invention. Consequently, it is preferred that the width of the backing ring be greater than the width of the seating portion of the wear ring.

Finally, it should be noted, as is already shown in the drawings, that the wedge angle of the bevelled inner circumferential surface of the backing ring is desirably greater than the angle between the bevelled sides of the channel in the shoulder portion of the wear ring, so that the backing ring preload will be exerted primarily against the outer edges of the wear ring for best sealing. The difference in angle may be about 10°, with the wedge angle of the backing ring being about 90° and the V-angle of the wear ring channel being about 80°.

We claim:

1. A valve for cryogenic service, the valve including a valve body having a fluid inlet and a fluid outlet connected by a passageway, an annular seating region defined by an interior circumferential surface of the passageway intermediate the inlet and outlet, and an annular undercut circumferential groove formed in the wall of the passageway in said seating region; a valve member having a circumferential sealing surface; means for rotatably mounting the valve member in the passageway for selective rotational movement of the sealing surface into and out of opposed relation to the groove; a resilient wear ring of a fluorinated hydrocarbon material disposed in the groove and movable radially inward and outward therein, the wear ring having an inner circumferential seating portion protruding radially inward from the groove into the passageway and an outer circumferential shoulder portion within the groove, the inner circumference of the seating portion forming a radially inward facing seating surface which makes an interference sealing fit with the sealing surface of the valve member when the valve is shut, and the outer circumference of the shoulder portion having a radially outward facing annular channel formed therein, the sides of said channel being bevelled outwardly to provide said channel with an at least partly V-shaped cross section, said channel dividing the shoulder portion into two axially-spaced annular parts the outer edges of which bear against the respective adjacent sides of the groove; and a backing ring disposed in said groove between the channel of the wear ring and the radially outward region of the groove, said backing ring urging the seating portion of said wear ring radially inward from said groove and urging the outer edges of the spaced annular parts of the shoulder portion against the respective sides of the groove, wherein the improvement comprises:

said backing ring being made of a metal having a relatively low modulus of elasticity combined with high yield strength at both normal ambient and cryogenic temperatures and formed as an annular band having an inner circumferential surface which is bevelled outwardly from a central region to both sides of the band to provide a solid trapezoidal wedge-shaped cross section, the bevelled sides of said wedge-shaped inner circumferential surface of the backing ring making a predetermined interference fit with the bevelled sides of said channel of the wear ring, and wherein the wedge angle of the bevelled inner circumferential surface of the backing ring is about 90° and is greater by about 10° than the angle between the bevelled sides of the channel in the shoulder portion of the wear ring, whereby the backing ring exerts pressure against the bevelled sides of the channel in the wear ring to provide effective sealing at the seating surface and both outer edges of the annular parts of the wear ring at valve operating temperatures from ambient down to cryogenic.

2. A valve according to claim 1 wherein the width of the backing ring is greater than the width of the seating portion.

3. A valve according to claim 2 wherein the backing ring is composed of aluminum.

4. A valve according to claim 1 wherein the outer edges of the two axially spaced annular parts of the shoulder portion of the wear ring make an initial predetermined interference fit with the sides of the groove.

5. A valve according to claim 1 wherein the backing ring is composed of nickel-chromium alloy.

* * * * *